Dec. 5, 1961 R. J. GROSS 3,011,742
STABILIZING DROGUE FOR AIRCRAFT REFUELING AND TOW LINES
AND METHOD FOR CONTROLLING DEFLECTION AND DRAG
Filed June 7, 1957 2 Sheets-Sheet 2
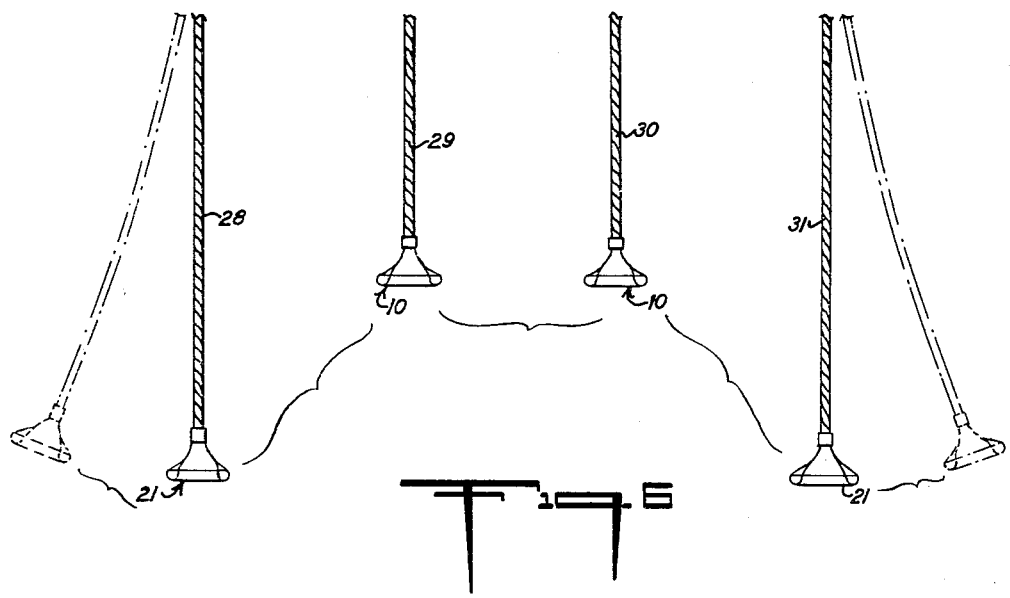
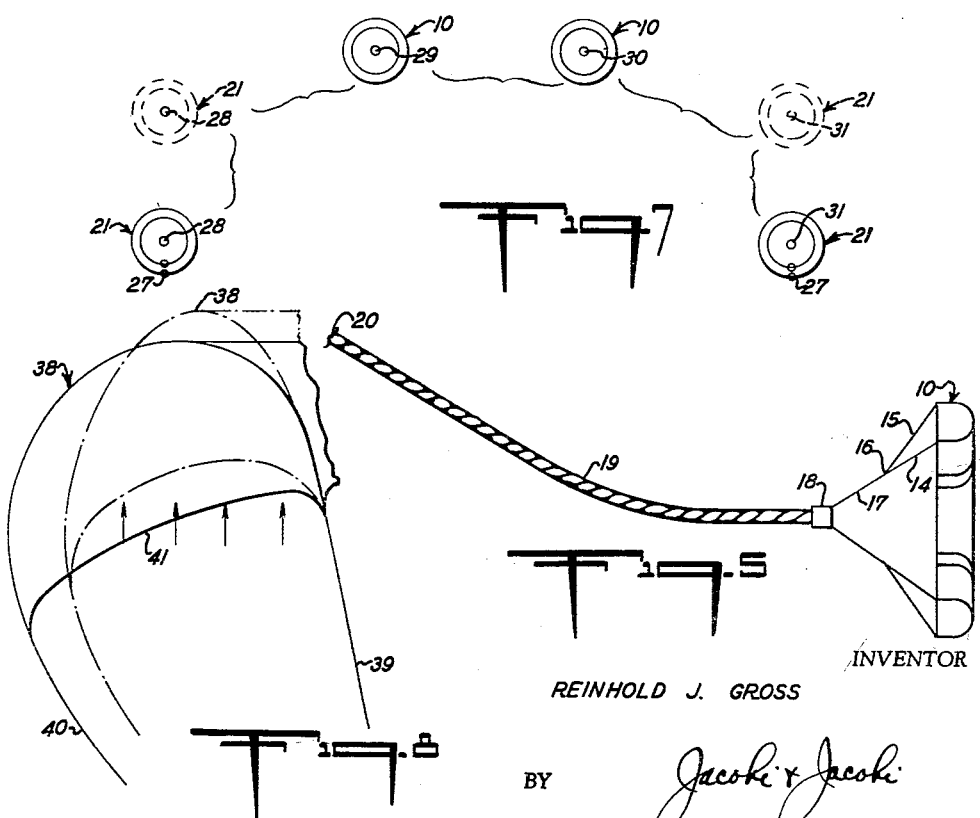
INVENTOR
REINHOLD J. GROSS
BY Jacobi & Jacobi
ATTORNEYS United States Patent Office 3,011,742
Patented Dec. 5, 1961

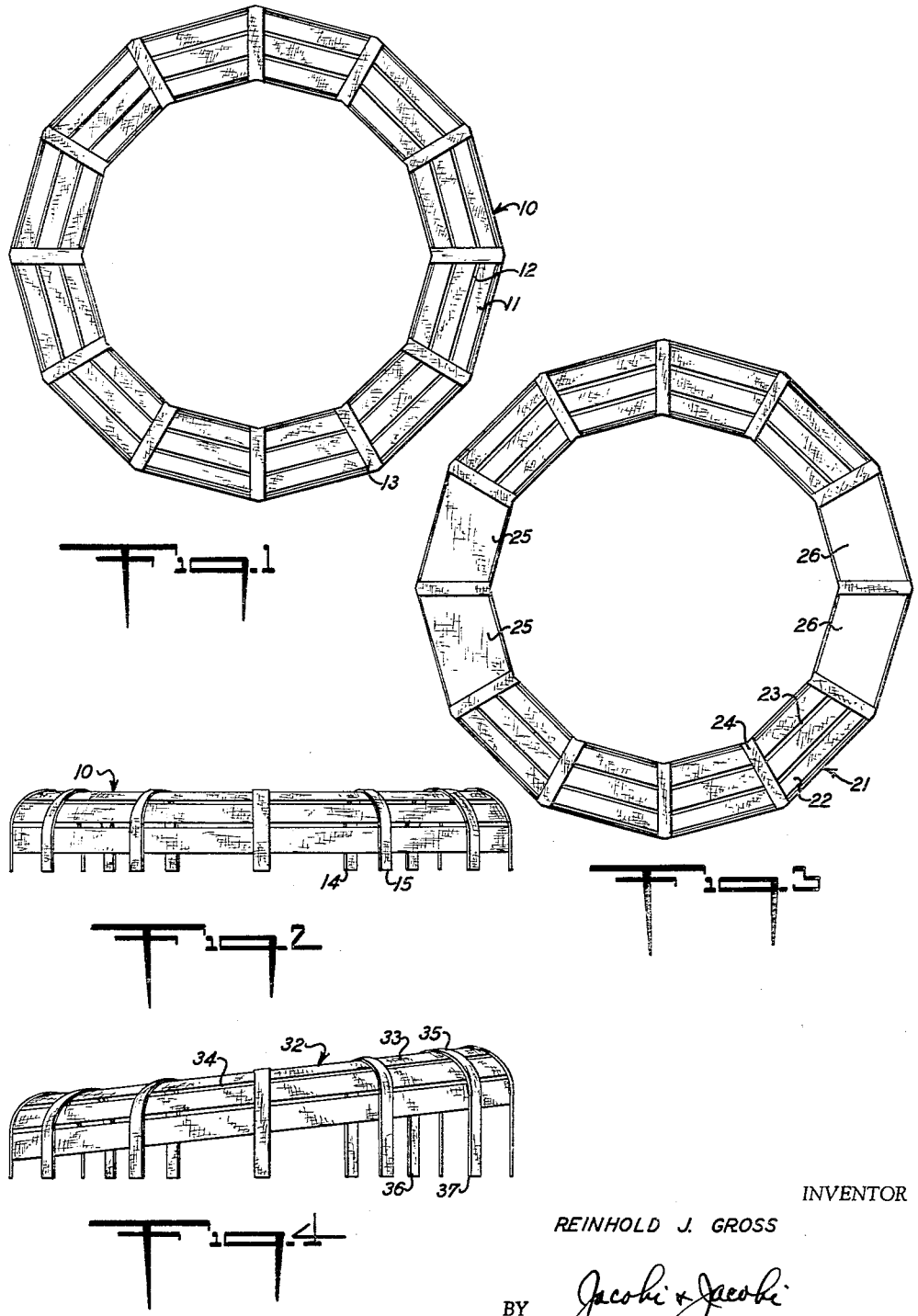

3,011,742
STABILIZING DROGUE FOR AIRCRAFT REFUELING AND TOW LINES AND METHOD FOR CONTROLLING DEFLECTION AND DRAG
Reinhold J. Gross, Dayton, Ohio, assignor to M. Steinthal & Co., Inc., New York, N.Y., a corporation of New York
Filed June 7, 1957, Ser. No. 664,381
18 Claims. (Cl. 244—135)

This invention relates to aeronautics and more particularly to a device in the form of a drogue for stabilizing aircraft refueling and tow lines and to methods and apparatus for controlling the deflection of such refueling or tow lines in a vertical or horizontal direction and for controlling the drag on such lines in accordance with the speed of travel thereof through the atmosphere.

With the advent of jet powered aircraft and the relatively high fuel consumption of such aircraft it has become necessary, particularly for military purposes and in order to provide sufficient range for such aircraft to develop systems and apparatus for refueling of the same while in flight. This, of course, is occasioned by the fact that flights of such aircraft will frequently be over territory where landing and refueling facilities are not feasible or available and consequently in order that long range missions may be accomplished, tanker planes having a speed commensurate with the speed of the aircraft to be refueled have been developed, together with means for transferring fuel from the tanker aircraft to the other aircraft without interrupting the flight thereof. This has commonly been accomplished by trailing a boom or fuel line from the tanker aircraft and attaching such line or boom to the aircraft to be refueled which, of course, necessitates skillful operation of both the tanker plane and the aircraft to be refueled and also depends to a great extent upon the stability of the trailing end of the boom or refueling line which must be attached to the aircraft to be refueled while in flight.

While it has been possible to stabilize refueling lines sufficiently for refueling a single aircraft at one time, it is extremely advantageous to be able to refuel a plurality of aircraft simultaneously and obviously, such an operation requires the maintenance of a substantially constant relationship between the separate refueling lines, as well as the utmost stability thereof in order to permit a plurality of aircraft to approach and attach their refueling connections to these lines without danger of collision between such aircraft or interference with the refueling operation.

It is proposed to stabilize refueling or tow lines for operations as mentioned above, by attaching a suitable drogue to the trailing end of the line and such drogue which operates much in the same manner as a sea anchor serves to maintain the trailing end of the refueling or tow line in a substantially constant position insofar as elevation and azimuth is concerned, but such drogues do not provide means for deflecting the refueling or tow lines to one side or the other of the direction of travel or to provide deflection in a vertical direction. Furthermore, the drag imposed on the tow line varies in proportion to the speed of the aircraft and consequently, the equipment must be designed to withstand the maximum drag to which the same will be subjected in refueling operations at a maximum speed, whereas if the drag could be controlled in such a manner as to maintain the same at a relatively low value regardless of the speed of the aircraft within predetermined limits, the design of the equipment could be materially simplified and the weight thereof reduced, which, of course, is a major consideration in any aircraft installation.

It is accordingly an object of the invention to provide a stabilizing drogue for aircraft refueling and tow lines which may be conveniently and economically manufactured from readily available lightweight materials which will provide a substantially constant stabilizing effect on the lines in order to maintain the same in proper position for refueling operations.

A further object of the invention is the provision of a stabilizing drogue for aircraft refueling and tow lines which may be conveniently modified to deflect such lines in a horizontal or vertical direction in accordance with the desired disposition of the same for simultaneous multiple refueling operations.

A still further object of the invention is the provision of a stabilizing drogue for aircraft refueling and tow lines including means for orienting the drogue about the axis thereof and to provide for vertical deflection of the same in order to locate the trailing end of the refueling or tow line in a desired position.

Another object of the invention is the provision of a stabilizing drogue for aircraft refueling and tow lines in which such drogue may be conveniently modified to provide a dynamic unbalance between opposite sides of the drogue thereby causing deflection of the refueling or tow line in accordance with the angular position and magnitude of the dynamic unbalance.

A further object of the invention is the provision of a stabilizing drogue for aircraft refueling and tow lines incorporating means for controlling the drag of the device in accordance with the speed of travel thereof within predetermined limits.

A still further object of the invention is the provision of a stabilizing drogue for aircraft refueling and tow lines incorporating means to vary the effective area thereof in response to changes in speed of travel in order to maintain the drag exerted by the device substantially constant within predetermined limits.

Another object of the invention is the provision of a method for controlling the deflection of aircraft refueling and tow lines in a horizontal or vertical direction with respect to the direction of travel thereof through the atmosphere.

A further object of the invention is the provision of a method for controlling the drag on an aircraft refueling or tow line to maintain the same substantially constant within a predetermined speed range.

Further objects and advantages of the invention will be apparent from the following description taken in conjunction with the accompanying drawing wherein:

FIG. 1 is a top plan view of a stabilizing drogue for aircraft refueling and tow lines constructed in accordance with this invention, but omitting the means for causing the deflection of such lines in a horizontal or vertical direction;

FIG. 2 a side elevational view of the drogue shown in FIG. 1;

FIG. 3 a top plan view similar to FIG. 1, but showing a drogue constructed in accordance with this invention and including means for providing a dynamic unbalance between opposite sides of the drogue in order to cause deflection of the refueling or tow line to one side or the other;

FIG. 4 a side elevational view of a modified form of this invention which serves to provide a dynamic unbalance between opposite sides thereof to cause deflection of the refueling or tow line to one side or the other;

FIG. 5 a side elevational view of a drogue constructed in accordance with this invention and secured to the trailing end of a refueling or tow line;

FIG. 6 a diagrammatic top plan view of a plurality of refueling lines and showing the manner of operation of the drogue of this invention to deflect such lines in a horizontal direction to accommodate a plurality of aircraft having different wing spans and for simultaneous refueling operations;

FIG. 7 a diagrammatic rear elevational view showing the disposition of a plurality of refueling lines with drogues constructed in accordance with this invention attached thereto and showing the means for orienting such drogues about the axes thereof and to provide for vertical deflection of the lines; and FIG. 8 a diagrammatic view showing a drogue constructed in accordance with this invention and including means responsive to the speed of movement for varying the effective area of the drogue to maintain the drag within the predetermined limits.

With continued reference to the drawing, there is shown in FIGS. 1 and 2 a stabilizing drogue for aircraft refueling and tow lines which may well comprise a generally ring-shaped canopy 10 of substantially U-shaped cross section when inflated, the canopy 10 being constructed of a plurality of transversely spaced annular strips 11 of fabric or other suitable material and with the spaces 12 between the strips 11 providing ring slots for the passage of air. Cross tapes 13 may be secured to the strips 11 at suitable intervals and serve to hold the same in spaced relation and at the same time, the cross tapes 13 depend downwardly to provide inner and outer shroud lines 14 and 15 respectively extending downwardly from the inner and outer peripheries of the canopy 10 and as shown in FIG. 5, the shroud lines 14 and 15 converge and are secured together at a point 16 with one line 17 of each pair extending downwardly in converging relationship and attached to the trailing end 18 of a refueling or tow line 19, the opposite end 20 of which is attached to a tanker or other aircraft. The canopy 10 may be attached to the trailing end 18 of the line 19 by a swivel or any other suitable means and upon movement of the tanker or other aircraft to pull the line 19 and canopy 10 through the atmosphere, the same will be inflated and operate in much the same manner as a parachute to provide a drag on the line 19 and stabilize the same to maintain the outer end 18 thereof in the desired position with respect to elevation and azimuth.

A drogue, such as that described above, is entirely suitable for use with a single refueling or tow line, but where it is desired to simultaneously refuel or tow a plurality of planes, it is sometimes necessary to deflect one or more of the lines in either a horizontal or vertical direction or in some cases, in both directions. This deflection is necessary in order to provide sufficient clearance between the aircraft in order to eliminate any possibility of collision therebetween or interference with the refueling or towing operations.

For this purpose there is shown in FIG. 3, a drogue constructed in accordance with this invention and which may well comprise a canopy 21 constructed in much the same manner as that described above and including a plurality of transversely spaced segmental strips 22 of fabric or other suitable material with the spaces 23 therebetween providing segmental slots for the passage of air. Similarly there are also provided cross tapes 24 secured to the strips 22 at suitable intervals and providing shroud lines for attaching the canopy 21 to the refueling or tow lines.

In order to provide for deflection of the canopy 22 and line attached thereto in any desired direction, one or more sections of the strips 22 and slots 23 may be completely closed by panels 25 of fabric or other suitable material and such panels may be either incorporated as a permanent part of the canopy 21 or may be removably secured thereto in any suitable manner. At the same time, diametrically opposite the panels 25 the strips 22 are removed to provide open spaces 26 which permits the free passage of air as the canopy 21 moves through the atmosphere and these oppositely disposed spaced 26 and closed panels 25 will serve to provide a dynamic unbalance between opposite sides of the canopy thereby causing the deflection or movement thereof to one side in the direction of the closed area provided by the panels 25. Obviously, by orienting the canopy 21 in such a manner as to dispose the closed and open areas at the desired angular location, the deflection of the canopy 21 in any desired direction may be controlled thereby.

Normally, however, the panels 25 and open areas 26 will be utilized to provide deflection or movement in a horizontal direction and in order to orient the canopy 21 in such a manner as to maintain the closed areas 25 and open areas 26 in the desired position, there may be provided ballast weights 27 in the canopy spaced substantially ninety degrees from the areas 25 and 26 which as shown in FIG. 7, will result in the areas 25 and 26 being maintained in a horizontal relationship thereby causing horizontal deflection or movement of the canopy 21, together with the line attached thereto. Also if desired, the ballast weights 27 may be of such a mass as to cause deflection of the canopy 21 in a vertical direction as shown in full lines FIG. 7, the position of the canopy without the ballast weights 27 or with the same reduced in value being shown in dotted lines in this figure. Consequently, the ballast weights 27 may be utilized to provide two different functions, one being the orientation of the canopy 21 about the axis thereof in order to properly position the closed and open areas 25 and 26 respectively to cause the desired horizontal deflection of the canopy and by providing weights 27 of sufficient mass, the same will operate to cause downward vertical deflection of the canopy to position the same and the line attached thereto at the desired location.

As best shown in FIG. 6, a plurality of refueling lines 28, 29, 30 and 31 may be attached to a tanker aircraft and normally the two inner lines 29 and 30 would be provided at the outer ends thereof with canopies 10 constructed as shown in FIGS. 1 and 2 to merely provide a stabilizing drag on the outer ends of the lines 29 and 30. However, it is frequently necessary or desirable to deflect the outer lines 28 and 31 outwardly in order to provide greater clearance between the aircraft being refueled and for this purpose, canopies 21, such as that shown in FIG. 3 would be attached to the outer end thereof and properly oriented to cause outward deflection of the lines 28 and 31 to the dotted line position shown in FIG. 6. In this case, of course, the closed areas 25 of the canopy 21 would be located on the outer side of the canopies 21 as viewed in FIG. 6, with the open areas 26 to the inner side thereof. As explained above, the dynamic unbalance provided by these open and closed areas would cause deflection of the canopies and lines as shown in FIG. 6.

The vertical deflection of the outer lines 28 and 31 by reason of the ballast weights 27 is clearly shown in FIG. 7 and, of course, the inclusion of such ballast weights would have no effect on the horizontal deflection of the lines, but would maintain the canopies 21 properly oriented to cause such horizontal deflection in the desired direction and at the same time, cause vertical downward deflection in accordance with the mass of the weights 27.

A somewhat modified form of the invention is shown in FIG. 4 in which a dynamic unbalance between opposite sides of the canopy is provided by a variation in the length of the shroud lines from one side of the canopy to the other thereby disposing the canopy in a plane inclined with respect to a plane normal to the direction of movement of the canopy. In this form of the invention, the canopy 32 may be of the same general structure as the canopy shown in FIG. 1 and described above and in which there is provided transversely spaced strips 33 of fabric or other suitable material with the spaces 34 between the strips 33 providing ring slots for the passage of air. Cross straps or tapes 35 are provided at suitable intervals and such tapes provide inner and outer shroud lines 36 and 37 depending from the inner and outer peripheries of the canopy 32 and as clearly shown in FIG. 4, the shroud lines 36 and 37 vary in length from one side of the canopy to the other thereby disposing the canopy in a plane inclined with respect to a plane normal to the direction of movement of the canopy through the atmosphere. In this manner, a dynamic unbalance is provided between opposite sides of the canopy which will result in horizontal deflection or movement of the same depending upon the orientation of such canopy. The orientation thereof, may, of course, be controlled by the inclusion of ballast weights at a suitable location thereon in the same manner as described above in connection with the form of the invention shown in FIG. 3. The degree of deflection may, of course, be controlled by varying the lengths of the shroud lines to change the angle of inclination of the canopy 32.

While the above described forms of the invention will serve to properly stabilize refueling or tow lines and will also provide for suitable deflection thereof in a horizontal or vertical direction, nevertheless, the drag imposed by these devices on the refueling or tow lines will vary in proportion to the speed of the aircraft to which the same are attached. Consequently, where it is necessary to operate at a relatively high speed in order to refuel high speed aircraft, the drag will be materially increased over that present when refueling aircraft of relatively lower speeds. Obviously, the equipment must be designed to withstand the greatest drag or force exerted thereon and consequently it is highly desirable to control the drag in accordance with the speed of the aircraft in such a manner as to maintain the same at the lowest possible value consistent with providing the proper stabilization and deflection of the refueling or tow lines.

This result may be accomplished for a predetermined range of speeds by a structure, such as that shown diagrammatically in FIG. 8 in which a ring shaped canopy 38 may be constructed substantially in accordance with the canopies described in the other forms of the invention and as described above, the canopy 38 may be provided with inner and outer shroud lines 39 and 40 respectively which converge and are attached to the refueling or tow line in the manner described above. In order to vary the effective area of the canopy 38 and to thereby vary the drag exerted thereby in accordance with the speed of movement of the canopy through the atmosphere, there may be provided a drag control tape or web 41 connected between the inner and outer shroud lines 39 and 40 immediately below the canopy 38. Any suitable number of such drag control tapes 41 may be provided but normally there would be one such tape for each pair of inner and outer shroud lines 39 and 40. When operating at minimum speed, the canopy 38 would be fully inflated and the drag control tape 41 fully extended between the inner and outer shroud lines 39 and 40 as shown in full lines in FIG. 8, and in this condition the maximum effective area of the canopy 38 would be exposed and the maximum drag exerted thereby. However, upon an increase in speed of the aircraft to which the canopy 38 is attached, the air pressure exerted on the drag control tape 41 would be increased thereby resulting in deflecting such tape to the position shown in dotted lines in FIG. 8, which, of course, would result in moving the inner and outer shroud lines 39 and 40 toward each other to materially reduce the effective area of the canopy 38 as shown in dotted lines in FIG. 8, thereby maintaining the drag exerted by such canopy substantially constant even though the speed of movement thereof through the atmosphere has been increased. This drag control means will operate to maintain a substantially constant drag within predetermined limits of speed thereby permitting the installation of equipment designed for such drag, rather than necessitating the use of equipment which will withstand the force exerted by the entire effective area of the canopy 38 at the highest speed to be utilized.

It will therefore be seen that there has been provided a relatively simple, yet highly effective means for controlling the drag of the canopy utilized as a drogue in accordance with this invention and that such system will result in materially reducing the cost and weight of the equipment necessary for use therewith which, of course, is highly desirable in connection with aircraft.

The various drogues of this invention may, of course, be utilized for different types of refueling and towing applications without necessitating the provision of specially designed drogues for each operation and furthermore, by utilizing the drag control system described above, such drogues may be utilized over a wide range of speed thereby permitting refueling operations of different types of aircraft without necessitating changing of the drogues for each separate refueling operation.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A stabilizing drogue for aircraft refueling and tow lines said drogue comprising a generally ring-shaped canopy of substantially U-shaped cross section when inflated, said canopy comprising a plurality of transversely spaced segmental strips of fabric material with the spaces therebetween providing segmental slots for the passage of air, shroud lines depending from the inner and outer peripheries of said canopy and secured to the trailing end of said refueling or tow line, means closing a portion of the slots on one side of the canopy to prevent the passage of air and with at least a part of the strips diametrically opposite said portion removed to permit the free passage of air thereby providing a dynamic unbalance between oppoiste sides of said canopy to cause horizontal deflection of said refueling or tow line to one side with respect to the direction of movement of said drogue and a ballast weight secured to said canopy at a selected angular location to orient said canopy about the axis thereof and to selectively provide vertical deflection of said refueling or tow line in proportion to the mass of said weight.

2. A device as defined in claim 1 in which a tape is secured to and extends between at least certain pairs of inner and outer shroud lines below said canopy, deflection of said tapes serving to move said inner and outer shroud lines toward each other to reduce the effective area of said canopy, the deflection of said tape being proportional to the speed of the airstream impinging thereon to maintain a substantially constant drag upon variations in speed of the aircraft within predetermined limits.

3. A device as defined in claim 1 in which means is provided to vary the effective area of said canopy upon a variation in the speed of the aircraft thereby maintaining a substantially constant drag on said refueling or tow line upon variations in speed of the aircraft within predetermined limits.

4. A stabilizing drogue for aircraft refueling and tow lines, said drogue comprising a generally ring-shaped canopy of substantially U-shaped cross section when inflated, said canopy comprising a plurality of transversely spaced segmental strips of material with the spaces therebetween providing segmental slots for the passage of air, shroud lines depending from the inner and outer peripheries of said canopy and secured to the trailing end of said refueling or tow line, means closing a portion of the slots on one side of the canopy to prevent the passage of air and with at least a part of the strips diametrically opposite said portion removed to permit the free passage of air thereby providing a dynamic unbalance between opposite sides of said canopy to cause horizontal deflection of said refueling or tow line to one side with respect to the direction of movement of said drogue and a ballast weight secured to said canopy at a selected annular location to orient said canopy about the axis thereof and to selectively provide vertical deflection of said refueling or tow line in proportion to the mass of said weight.

5. A stabilizing drogue for aircraft refueling and tow lines, said drogue comprising a generally ring-shaped canopy of substantially U-shaped cross section when inflated, said canopy comprising a plurality of transversely spaced segmental strips of material with the spaces therebetween providing segmental slots for the passage of air, shroud lines depending from the inner and outer peripheries of said canopy and secured to the trailing end of said refueling or tow line, means closing a portion of the slots on one side of the canopy to prevent the passage of air and with at least a part of the strips diametrically opposite said portion removed to permit the free passage of air thereby providing a dynamic unbalance between opposite sides of said canopy to cause deflection of said refueling or tow line to one side with respect to the direction of movement of said drogue and a ballast weight secured to said canopy at a selected angular location to orient said canopy about the axis thereof.

6. A stabilizing drogue for aircraft refueling and tow lines, said drogue comprising a generally ring-shaped canopy of substantially U-shaped cross section when inflated, said canopy comprising a plurality of transversely spaced segmental strips of material with the spaces therebetween providing segmental slots for the passage of air, shroud lines depending from the inner and outer peripheries of said canopy and secured to the trailing end of said refueling or tow line, means closing a portion of the slots on one side of the canopy to prevent the passage of air and with at least a part of the strips diametrically opposite said portion removed to permit the free passage of air thereby providing a dynamic unbalance between opposite sides of said canopy to cause deflection of said refueling or tow line to one side with respect to the direction of movement of said drogue and means on said canopy to orient said canopy about the axis thereof.

7. A device as defined in claim 6 in which a tape is secured to and extends between at least certain pairs of inner and outer shroud lines below said canopy, deflection of said tape serving to move said inner and outer shroud lines toward each other to reduce the effective area of said canopy, the deflection of said tape being proportional to the speed of the airstream impinging thereon whereby to maintain a substantially constant drag upon variations of speed in the aircraft within predetermined limits.

8. A device as defined in claim 6 in which means is provided for moving the inner and outer shroud lines toward each other to vary the effective area of said canopy in accordance with changes in speed of the aircraft thereby maintaining the drag of said canopy substantially constant upon variations in speed of the aircraft within predetermined limits.

9. A stabilizing drogue for aircraft refueling and tow lines, said drogue comprising a generally ring shaped canopy of substantially U-shaped cross section when inflated, said canopy comprising a plurality of transversely spaced annular strips of fabric material with the spaces therebetween providing ring slots for the passage of air, shroud lines depending from the inner and outer peripheries of said canopy and secured to the trailing end of said refueling or tow line, said shroud lines varying in length from one side of said canopy to the diametrically opposite side to dispose said canopy in a plane inclined with respect to a plane normal to the direction of movement of said drogue thereby providing a dynamic unbalance between opposite sides of said canopy to cause horizontal deflection of said refueling or tow line to one side with respect to the direction of movement of said drogue and a ballast weight secured to said canopy at a selected angular location to orient said canopy about the axis thereof and to selectively provide vertical deflection of said refueling or tow line in proportion to the mass of said weight.

10. A device as defined in claim 9 in which a tape is secured to and extends between at least certain pairs of inner and outer shroud lines below said canopy, deflection of said tape serving to move said inner and outer shroud lines toward each other to reduce the effective area of said canopy, the deflection of said tape being proportional to the speed of the airstream impinging thereon whereby to maintain a substantially constant drag upon variations in speed of the aircraft within predetermined limits.

11. A device as defined in claim 9 in which means is provided to vary the effective area of said canopy in response to changes in speed of the aircraft thereby maintaining a substantially constant drag upon variations in speed of the aircraft within predetermined limits.

12. A stabilizing drogue for aircraft refueling and tow lines, said drogue comprising a generally ring shaped canopy of substantially U-shaped cross section when inflated, said canopy comprising a plurality of transversely spaced annular strips of material with the spaces therebetween providing ring slots for the passage of air, shroud lines depending from the inner and outer peripheries of said canopy and secured to the trailing end of said refueling or tow lines, said shroud lines varying in length from one side of said canopy to the diametrically opposite side to dispose said canopy in a plane inclined with respect to a plane normal to the direction of movement of said drogue thereby providing a dynamic unbalance between opposite sides of said canopy to cause horizontal deflection of said refueling or tow line to one side with respect to the direction of movement of said drogue and a ballast weight secured to said canopy at a selected angular location to orient said canopy about the axis thereof and to selectively provide vertical deflection of said refueling or tow lines in proportion to the mass of said weight.

13. A stabilizing drogue for aircraft refueling and tow lines, said drogue comprising a generally ring shaped canopy of substantially U-shaped cross section when inflated, said canopy comprising a plurality of transversely spaced annular strips of material with the spaces therebetween providing ring slots for the passage of air, shroud lines depending from the inner and outer peripheries of said canopy and secured to the trailing end of said refueling or tow lines, said shroud lines varying in length from one side of said canopy to the diametrically opposite side to dispose said canopy in a plane inclined with respect to a plane normal to the direction of movement of said drogue thereby providing a dynamic unbalance between opposite sides of said canopy to cause horizontal deflection of said refueling or tow line to one side with respect to the direction of movement of said drogue and a ballast weight secured to said canopy at a selected angular location to orient said canopy about the axis thereof.

14. A stabilizing drogue for aircraft refueling and tow lines, said drogue comprising a generally ring shaped canopy of substantially U-shaped cross section when inflated, said canopy comprisng a plurality of transversely spaced annular strips of material with the spaces therebetween providing ring slots for the passage of air, shroud lines depending from the inner and outer periphery of said canopy and secured to the trailing end of said refueling or tow line, said shroud lines varying in length from one side of said canopy to the diametrically opposite side to dispose said canopy in a plane inclined with respect to a plane normal to the direction of movement of said drogue thereby providing a dynamic unbalance between opposite sides of said canopy to cause horizontal deflection of said refueling or tow line to one side with respect to the direction of movement of said drogue and means on said canopy to orient said canopy about the axis thereof.

15. A stabilizing drogue for aircraft refueling and tow lines, said drogue comprising a generally ring shaped canopy of substantially U-shaped cross section when inflated, said canopy comprising a plurality of transversely spaced segmental strips of material with the spaces therebetween providing segmental slots for the passage of air, shroud lines depending from the inner and outer peripheries of said canopy and secured to the trailing end of said refueling or tow line, means operatively associated with said canopy providing a dynamic unbalance between opposite sides of said canopy to cause deflection of said refueling or tow line to one side with respect to the direction of movement of said drogue and means on said canopy to orient said canopy about the axis thereof.

16. A device as defined in claim 15 in which a tape is secured to and extends between at least certain pairs of inner and outer shroud lines below said canopy, deflection of said tape serving to move said inner and outer shroud lines toward each other to reduce the effective area of said canopy, the deflection of said tape being proportional to the speed of the airstream impinging thereon whereby to maintain a substantially constant drag upon variations in speed of the aircraft within predetermined limits.

17. A device as defined in claim 15 in which means connected to said canopy is provided to vary the effective area of said canopy in accordance with changes in speed of the aircraft whereby to maintain a substantially constant drag upon variations in speed of the aircraft within predetermined limits.

18. A method of deflecting the trailing end of an aircraft refueling or tow line having a ring shaped drogue attached thereto which comprises causing a dynamic unbalance between diametrically opposite sides of the drogue and selectively orienting the drogue about the axis thereof to provide deflection in the desired direction.

References Cited in the file of this patent

UNITED STATES PATENTS

| | | |
|---|---|---|
| 2,566,585 | Smith | Sept. 4, 1951 |
| 2,721,716 | Beadle | Oct. 25, 1955 |
| 2,746,699 | Hart | May 22, 1956 |
| 2,785,646 | Meyer | Mar. 19, 1957 |
| 2,823,881 | Patterson | Feb. 18, 1958 |

FOREIGN PATENTS

| | | |
|---|---|---|
| 281,881 | Great Britain | Dec. 15, 1927 |
| 874,034 | France | Apr. 13, 1942 |